(12) United States Patent
Geyer et al.

(10) Patent No.: US 7,827,501 B2
(45) Date of Patent: Nov. 2, 2010

(54) INTERACTIVE ALERT BUBBLES FOR ALERT MANAGEMENT

(75) Inventors: Werner Geyer, Boston, MA (US); Elizabeth A. Brownholtz, Andover, MA (US); Martin T. Moore, Somerville, MA (US); Michael Muller, Medford, MA (US); Steven Ross, S. Hamilton, MA (US); Shilad W. Sen, Minneapolis, MN (US); Michael C. Wu, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 990 days.

(21) Appl. No.: 11/560,436

(22) Filed: Nov. 16, 2006

(65) Prior Publication Data

US 2008/0120545 A1 May 22, 2008

(51) Int. Cl.
*G06F 15/00* (2006.01)
*G06F 13/00* (2006.01)
(52) U.S. Cl. .................................. 715/765; 715/715
(58) Field of Classification Search ......... 715/700–715, 715/763–765, 853–855, 740–742
See application file for complete search history.

(56) References Cited

U.S. PATENT DOCUMENTS

| | | | |
|---|---|---|---|
| 6,553,416 B1 | 4/2003 | Chari et al. | |
| 6,565,608 B1 | 5/2003 | Fein et al. | |
| 2002/0054117 A1 | 5/2002 | van Dantzich et al. | |
| 2003/0149754 A1 | 8/2003 | Miller, II et al. | |
| 2004/0261030 A1 | 12/2004 | Nazzal | |
| 2006/0010394 A1* | 1/2006 | Chaudhri et al. | ............. 715/779 |
| 2006/0200842 A1* | 9/2006 | Chapman et al. | ............. 725/34 |

FOREIGN PATENT DOCUMENTS

CN    1467652 A    1/2004

* cited by examiner

*Primary Examiner*—Kevin Nguyen
(74) *Attorney, Agent, or Firm*—Steven C. Kurlowecz, Esq.; Steven M. Greenberg, Esq.; Carey Rodriguez Greenberg & Paul LLP

(57) ABSTRACT

Embodiments of the present invention address deficiencies of the art in respect to alert bubble management and provide a method, data processing system and computer program product for interactive alert bubbles for alert bubble management. In one embodiment of the invention, an interactive alert bubble can be provided for an alert management data processing system. The interactive alert bubble can include an alert bubble interface to the interactive alert bubble. An alert text field can be disposed in the interface and configured to provide a reference to an alert notification in the alert management data processing system. Additionally, a rating control can be disposed in the interface and configured to establish a rating for the alert notification responsive to a selection of the rating control.

21 Claims, 3 Drawing Sheets

INTERACTIVE ALERT BUBBLES FOR ALERT MANAGEMENT

BACKGROUND OF THE INVENTION

1. Field of the Invention

The present invention relates to the field of alert management for computing events and more particularly to user interface alert bubbles for computing events.

2. Description of the Related Art

Alert management in a computing system refers to the alerting of an end user through a user interface of a computing application of a computing event. Computing applications and systems often encounter computing events worth noting on the part of the end user. Historically, alerting an end user of a computing event required the suspension of an executing application and the presentation of text or a visual display notifying the end user of an alert condition. While effective in a computing environment in which only a single application can execute at a time, for multi-tasking environments, it is not reasonable to permit the interruption of all applications to present an alert.

In traditional windowing operating systems that provide multi-tasking functionality, alert management is incorporated into the operating system itself. In this regard, the operating system can provide an application programming interface (API) for invoking alerts through the operating system user interface. Often in the form of an alert box or an alert balloon, an alert can be provided by invoking a suitable operation through the alert management API. The alert itself, can be raised from a task bar or other similar such structure.

Alerts presented through the task bar of an operating system can suffice for relatively few alerts within a period of time. Notwithstanding, alerts can become intrusive where many alerts issued from multiple applications are presented repeatedly within the operating system interface. In the latter circumstance, end users may be distracted in addressing each alert. To avoid the latter circumstance, advanced alert management logic permits the configuration of the operating system to issue alerts only arising to a specified level of prioritization or importance. An alternative solution is to disable alerts entirely. In both cases, end users may not view important alerts, or otherwise end users may be compelled to view all alerts.

Advanced alert management systems rely upon statistical rating systems to determine whether or not to display an alert. Specifically, each alert can be assigned a rating based upon whether or not an end user had previously designated the alert as one which ought to be suppressed or viewed. The preferences of an end user can change over time, however, and a static rating system can result in the unintended suppression of important alerts. Likewise, a static rating system can result in the unintended viewing of unimportant alerts.

BRIEF SUMMARY OF THE INVENTION

Embodiments of the present invention address deficiencies of the art in respect to alert bubble management and provide a novel and non-obvious method, system and computer program product for interactive alert bubbles for alert bubble management. In one embodiment of the invention, an interactive alert bubble can be provided for an alert management data processing system. The interactive alert bubble can include an alert bubble interface to the interactive alert bubble. An alert text field can be disposed in the interface and configured to provide a reference to an alert notification in the alert management data processing system. Additionally, a rating control can be disposed in the interface and configured to establish a rating for the alert notification responsive to a selection of the rating control.

In another embodiment of the invention, an alert management method for an interactive alert bubble can be provided. The method can include retrieving a rating for a received alert notification and determining whether to suppress or display the interactive alert bubble for the alert notification based upon the rating. If it is determined to display the interactive alert bubble for the alert notification based upon the rating, the interactive alert bubble can be displayed and a new rating can be solicited for the alert notification through the interactive alert bubble. Thereafter, the rating for the alert notification can be modified with the new rating.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for an interactive alert bubble for an alert management system. In accordance with an embodiment of the present invention, an interactive alert bubble can be activated for use with an alert management system. The interactive alert bubble can include a user interface incorporating an alert field for displaying an alert and controls for rating an alert provided within the alert field. The controls can be decorated with a pop-up menu providing access to do-not-disturb options and alert rule selections. The alert field, in turn, not only can display an incoming alert, but also one or more peer ratings for the alert. Finally, the alert bubble can include rolled-up alerts within a single alert field, or across a cascade of alert fields.

Figure 1:
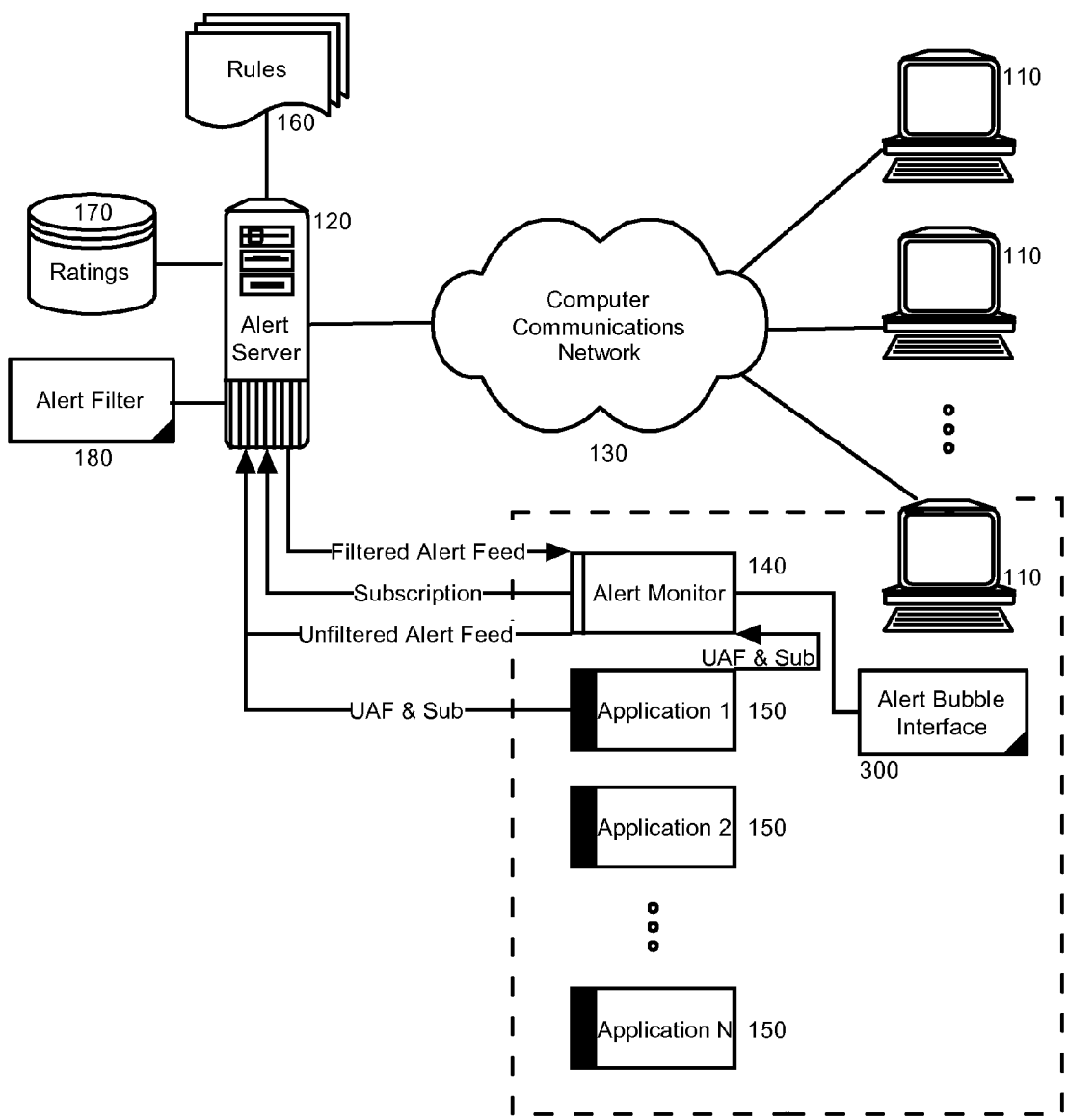
FIG. 1 is a schematic illustration of an alert management data processing system configured with interactive alert bubbles.

In further illustration, FIG. 1 is a schematic illustration of an alert management data processing system configured with interactive alert bubbles. The data processing system can include an alert server 120 coupled to one or more application hosts 110 over a computer communications network 130. Each of the application hosts 110 can host one or more application views 150 to corresponding applications, such as those hosted locally, or those provided by an application server in a composite aggregation environment. Each of the application hosts 110 further can include an alert monitor 140. The alert monitor 140 can include program code enabled to subscribe to one or more alerts in the alert server 120 on behalf of one or more of the applications associated with the application views 150. In one aspect of the invention, the subscription can be that of a subscription of a really simple syndication (RSS) compliant feed or an Atom compliant feed.

The alert server 120 can include both a set of filter rules 160 for one or more alerts defining whether to suppress or display a respective unfiltered alert, and a data store of statistical ratings 170 for previously filtered alerts. Predictive alert filter logic 180 also can be coupled to the alert server 120. The predictive alert filter logic 180 can include program code enabled to train the prediction of an alert filter for an unfiltered alert based upon the statistical ratings 170 for previously filtered alerts. Utilizing the predictive alert filter 180, it can be predicted whether or not to filter an unfiltered alert without exclusively relying upon the presence of a static filter rule for the unfiltered alert. In fact, the ratings 170 produced by the predictive alert filter 180 can be used to statistically determine whether or not to suppress or display an alert even in the complete absence of a static filter rule for the unfiltered alert.

In operation, the alert monitor 140 within an application host 110 can subscribe to an alert on behalf of an application and corresponding one of the application views 150 with the alert server 120. The alert server 120, in turn, can process incoming alerts from the alert monitor 140 in order to determine whether or not to render an alert for the corresponding one of the application views 150 within an alert bubble interface 300. To manage the receipt of a multiplicity of alerts, an alert queue (not shown) can be established to queue unfiltered alerts prior to adaptively managing the processing of the unfiltered alerts.

Figure 2:
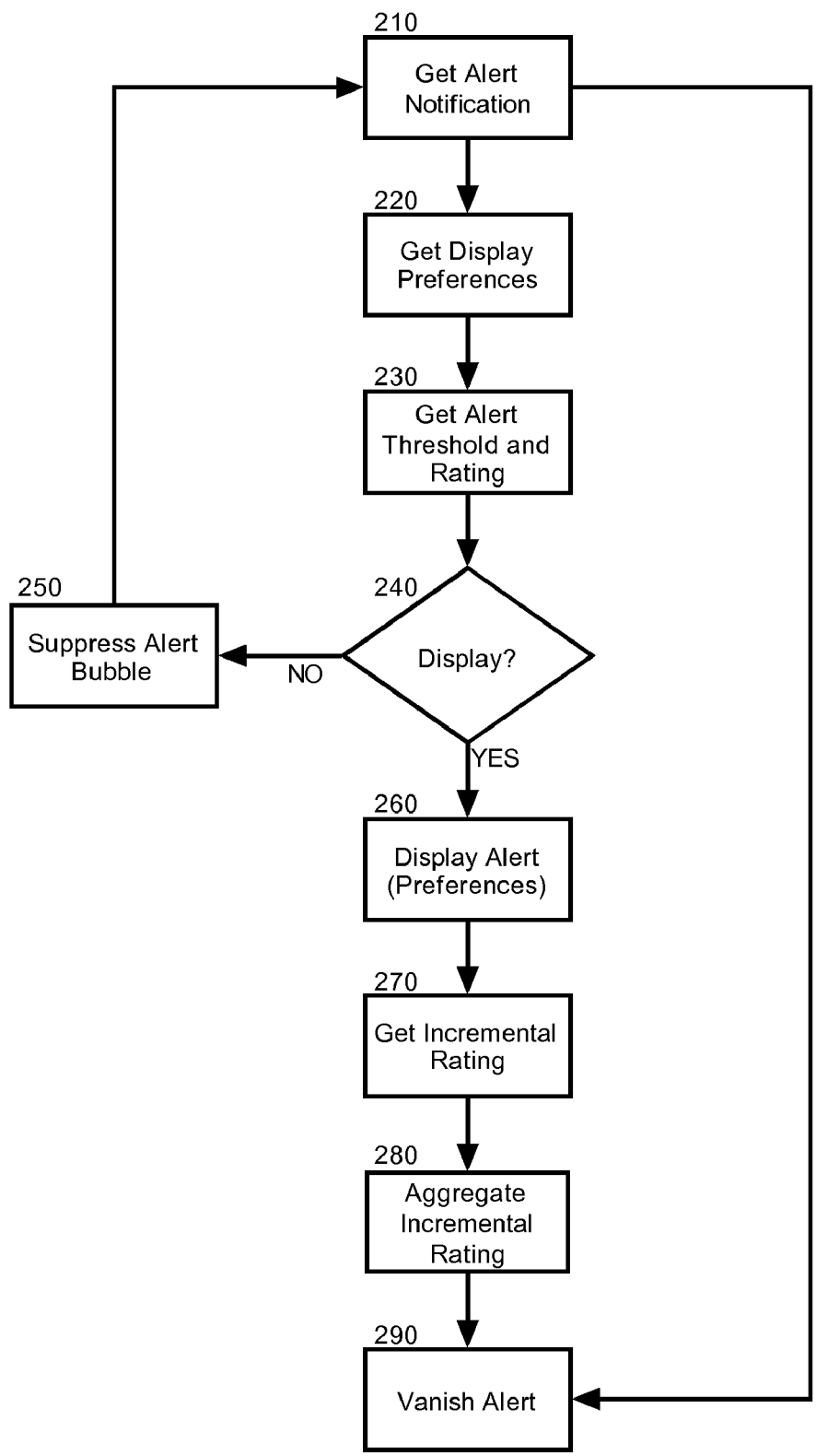
FIG. 2 is a flow chart illustrating a process for managing alert bubble interactions in an alert management system; and, FIGS. 3A through 3G, are pictorial illustrations of different embodiments of an interactive alert bubble.

The alert bubble interface 300 can provide an interactive mechanism for establishing a rating for a particular alert. The rating established through the alert bubble interface 300 can be utilized by the alert monitor 140 to determine whether or not to provide an alert bubble upon receipt of a subsequent instance of the particular alert. By soliciting the rating from within the alert bubble interface 300 itself, the alert monitor can adapt to the personal preferences of end users. In more particular illustration, FIG. 2 is a flow chart illustrating a process for managing alert bubble interactions in an alert management system.

Beginning in block 210, an alert notification can be received in the alert management system. In block 220, the display preferences can be retrieved for the alert management system. The display preferences can include, for instance, whether or not alert bubbles are to be rendered, whether alerts are to be aggregated into a single alert bubble, and whether past ratings for alerts are to be presented through the alert bubble interface. Additionally, in block 230, a threshold can be identified for the particular alert notification above which an alert bubble is to be rendered, and below which an alert bubble is not to be rendered. Likewise, in block 230 a rating for the particular alert notification can be identified and compared to the threshold.

In decision block 240, it can be determined whether or not to render an alert bubble for the alert notification based upon the comparison and the display preferences. If not, in block 250 the alert bubble display can be suppressed. Otherwise, in block 260 an alert bubble can be rendered for the alert notification. Thereafter, in block 270, an incremental rating can be received through the alert bubble interface for the alert notification. Thereafter, in block 280 the incremental rating can be aggregated with the existing rating and in block 290, the alert can vanish. The process then can repeat through block 210 for a next received alert.

The alert bubble interface can provide a number of controls and user interface elements intended both to solicit the rating of a particular alert notification, and also to present information relating to past ratings of similar alert notifications. The alert bubble interface yet further can provide user interface controls intended to solicit the establishment of rules controlling when an alert bubble is to be shown or suppressed for a particular alert notification. In yet further illustration, FIGS. 3A through 3G, are pictorial illustrations of different embodiments of an interactive alert bubble.

Figure 3A:
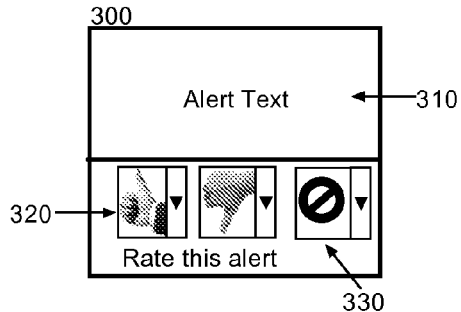
Figure 3B:
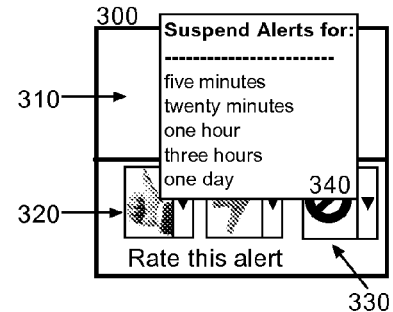

Initially considering FIG. 3A, an alert bubble interface 300 is shown. The alert bubble interface 300 can include an alert text field 310 in which alert text for an alert notification can be displayed. The alert bubble interface 300 further can include one or more rating controls 320 and a suspension control 330. The rating controls 320 can allow single click access to rating the desirability of an alert notification displayed in the alert text field 310. The suspension control 330 in turn can provide single click access to alert suspension rules as shown in FIG. 3B.

Figure 3C:
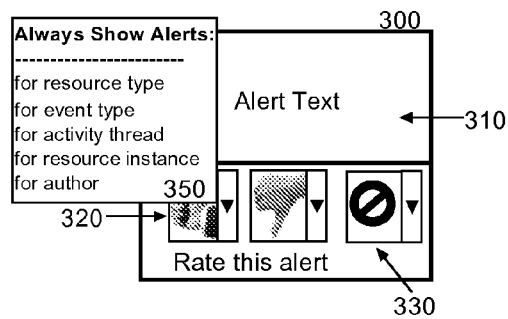
Figure 3D:
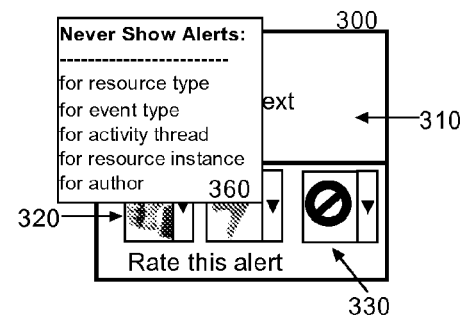

Referring to each of FIGS. 3C and 3D, each of the rating controls 320 can include a decorator enabled to drop down associated pop-up menus 350, 360. The pop-up menus 350, 360 can provide single click access to a set of rules specifying either to always show or never show an alert bubble for an alert notification satisfying selected criteria. The criteria can include, by way of example, a particular resource type referenced by the alert notification, an event type for the alert notification, an activity thread for the alert notification, a resource instance for the alert notification, or an author associated with the alert notification, to name only a few criteria.

Figure 3E:
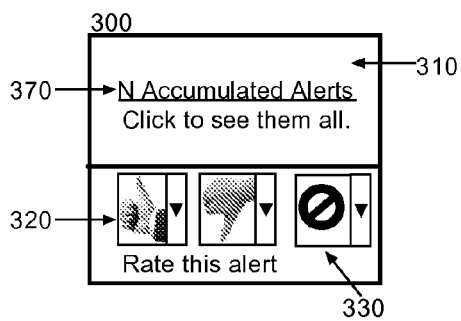
Figure 3G:
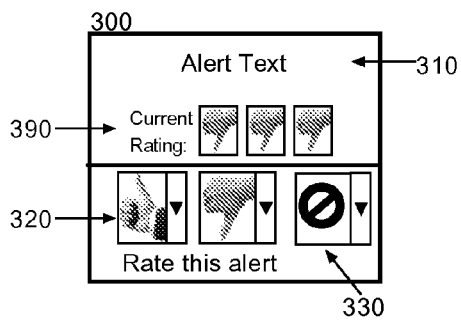
Figure 3F:
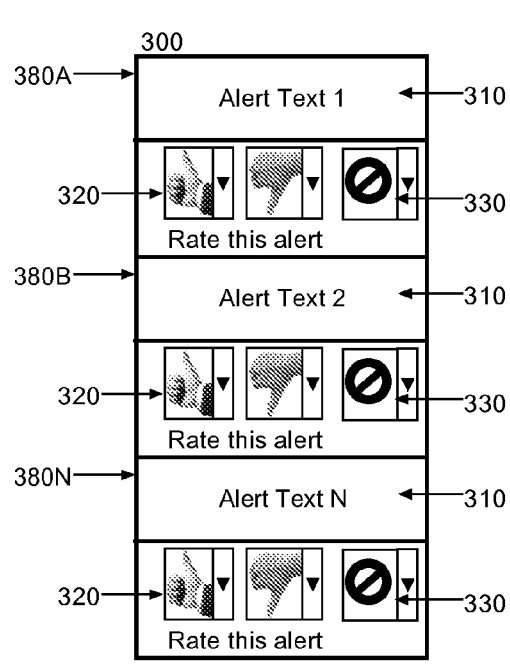

Notably, so as to conserve screen real estate, the alert text field 310 can accommodate a link 370 to multiple different alert notifications within a single alert bubble interface 300 as shown in FIG. 3E. Alternatively, each separate alert notification 380A, 380B, 380N can be listed in a cascade of alert bubbles as shown in FIG. 3F. Finally, so as to facilitate the rating of a particular alert notification, a prior rating display 390 can be provided within the alert bubble interface 300 indicating past ratings for the alert notification.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. In an alert management data processing system, an interactive alert bubble comprising:
    an alert bubble executing in memory by a processor of a computer;
    an alert bubble interface to the interactive alert bubble;
    an alert text field disposed in the interface and configured to provide a reference to an alert notification in the alert management data processing system; and,
    a rating control disposed in the interface and configured to establish a rating for the alert notification responsive to a selection of the rating control.

2. The alert bubble of claim 1, further comprising a suspension control configured to provide a pop-up menu defining rules for suspending alerts for a variable duration.

3. The alert bubble of claim 1, wherein the rating control comprises a decorator enabled to provide a pop-up menu defining a set of rules specifying to always show the alert bubble for an alert notification satisfying selected criteria.

4. The alert bubble of claim 3, wherein the criteria comprises criteria selected from the group consisting of a particular resource type referenced by the alert notification, an event type for the alert notification, an activity thread for the alert notification, a resource instance for the alert notification, and an author associated with the alert notification.

5. The alert bubble of claim 1, wherein the rating control comprises a decorator enabled to provide a pop-up menu defining a set of rules specifying to never show the alert bubble for an alert notification satisfying selected criteria.

6. The alert bubble of claim 5, wherein the criteria comprises criteria selected from the group consisting of a particular resource type referenced by the alert notification, an event type for the alert notification, an activity thread for the alert notification, a resource instance for the alert notification, and an author associated with the alert notification.

7. The alert bubble of claim 1, wherein the alert text field comprises a link to multiple different alert notifications within the alert bubble interface.

8. The alert bubble of claim 1, further comprising a plurality of additional alert text fields for different respective alert notifications arranged in a cascade of alert bubbles.

9. The alert bubble of claim 1, wherein the alert text field further comprises a prior rating display indicating past ratings for the alert notification.

10. An alert management method for an interactive alert bubble comprising:
    retrieving a rating for a received alert notification in an alert monitor executing in an application host coupled to an alert server over a computer communications network;
    determining whether to suppress or display the interactive alert bubble for the alert notification based upon the rating; and,
    if it is determined to display the interactive alert bubble for the alert notification based upon the rating, displaying the interactive alert bubble, soliciting a new rating for the alert notification through the interactive alert bubble and modifying the rating for the alert notification with the new rating.

11. The method of claim 10, wherein displaying the interactive alert bubble further comprises providing a pop-up menu defining a set of rules specifying to suppress a display of the interactive alert bubble for an alert notification satisfying selected criteria.

12. The method of claim 10, wherein displaying the interactive alert bubble further comprises providing a pop-up menu defining a set of rules specifying to always display the alert bubble for an alert notification satisfying selected criteria.

13. The method of claim 10, wherein displaying the interactive alert bubble further comprises providing a link to multiple different alert notifications within the interactive alert bubble.

14. The method of claim 10, wherein displaying the interactive alert bubble further comprises displaying additional alerts for different respective alert notifications arranged in a cascade of interactive alert bubbles.

15. The method of claim 10, wherein displaying the interactive alert bubble further comprises providing a prior rating display in the interactive alert bubble indicating past ratings for the alert notification.

16. A computer program product comprising a non-transitory computer usable medium having computer usable program code for alert management for an interactive alert bubble, the computer program product including:
    computer usable program code for retrieving a rating for a received alert notification;
    computer usable program code for determining whether to suppress or display the interactive alert bubble for the alert notification based upon the rating; and,
    computer usable program code for, if it is determined to display the interactive alert bubble for the alert notification based upon the rating, displaying the interactive alert bubble, soliciting a new rating for the alert notification through the interactive alert bubble and modifying the rating for the alert notification with the new rating.

17. The computer program product of claim 16, wherein the computer usable program code for displaying the interactive alert bubble further comprises computer usable program code for providing a pop-up menu defining a set of rules specifying to suppress a display of the interactive alert bubble for an alert notification satisfying selected criteria.

18. The computer program product of claim 16, wherein the computer usable program code for displaying the interactive alert bubble further comprises computer usable program code for providing a pop-up menu defining a set of rules specifying to always display the alert bubble for an alert notification satisfying selected criteria.

19. The computer program product of claim 16, wherein the computer usable program code for displaying the interactive alert bubble further comprises computer usable program code for providing a link to multiple different alert notifications within the interactive alert bubble.

20. The computer program product of claim 16, wherein the computer usable program code for displaying the interactive alert bubble further comprises computer usable program code for displaying additional alerts for different respective alert notifications arranged in a cascade of interactive alert bubbles.

21. The computer program product of claim 16, wherein the computer usable program code for displaying the interactive alert bubble further comprises computer usable program code for providing a prior rating display in the interactive alert bubble indicating past ratings for the alert notification.

* * * * *